United States Patent [19]

Smith, Jr. et al.

[11] 4,247,755
[45] * Jan. 27, 1981

[54] HIGH PRESSURE AUTOCLAVE

[75] Inventors: Charles W. Smith, Jr., Fairview; William H. Walker; Franz X. Zimmerman, both of Erie, all of Pa.

[73] Assignee: Autoclave Engineers, Inc., Erie, Pa.

[*] Notice: The portion of the term of this patent subsequent to Apr. 24, 1996, has been disclaimed.

[21] Appl. No.: 869,828

[22] Filed: Jan. 16, 1978

Related U.S. Application Data

[63] Continuation-in-part of Ser. No. 780,718, Mar. 24, 1977, abandoned.

[51] Int. Cl.³ ............................................. H05B 3/00
[52] U.S. Cl. .................................. 219/400; 219/415; 13/20; 13/25; 425/405 H
[58] Field of Search ............... 219/386, 387, 341, 392, 219/398, 400, 401, 403; 13/20, 25, 31; 266/184, 255, 263; 23/288 M; 432/262, 249, 156, 219

[56] References Cited

U.S. PATENT DOCUMENTS

| | | | |
|---|---|---|---|
| 1,986,088 | 1/1935 | Wild | 219/400 |
| 2,221,595 | 11/1940 | Lockwood | 219/400 |
| 3,004,090 | 10/1961 | Donovan et al. | 13/31 |
| 3,139,474 | 6/1964 | Weech | 13/31 |
| 3,395,241 | 7/1968 | Roman | 13/25 |
| 3,419,935 | 1/1969 | Pfeiler et al. | 425/405 H |
| 3,548,062 | 12/1970 | Smith, Jr. | 13/20 |
| 3,571,850 | 3/1971 | Pohoto | 425/405 H |
| 3,598,378 | 8/1971 | Lundstrom | 432/249 |
| 3,961,905 | 6/1976 | Rice | 432/262 |

FOREIGN PATENT DOCUMENTS 513684  10/1939  United Kingdom ..................... 219/400

Primary Examiner—Roy N. Envall, Jr.
Assistant Examiner—Bernard Roskoski
Attorney, Agent, or Firm—Webb, Burden, Robinson & Webb

[57] ABSTRACT

An apparatus for treating a workpiece at elevated temperatures and pressures comprising an elongate cylindrical pressure vessel. Within the pressure vessel a hearth sits upon a pedestal. Heating elements are circumferentially spaced about the hearth. A heat insulating hood separates the workpiece from the pressure vessel. A cylindrical reflecting shield separates the heating element from the insulating hood.

12 Claims, 7 Drawing Figures

HIGH PRESSURE AUTOCLAVE

RELATED APPLICATION

This application is a continuation-in-part of application Ser. No. 780,718, filed Mar. 24, 1977 now abandoned having the same title.

BACKGROUND

In prior art high pressure furnaces, uniform temperature distribution was sought either by circulating the pressurized atmosphere through the furnace or by carefully arranging the heating elements and individually controlling them. This application is directed to improvements in the gas circulation technique wherein no mechanical means are used to promote circulation.

Prior art methods of promoting gas circulation without mechanical apparatus such as fans are taught in U.S. Pat. Nos. 3,419,935 to Pfeiler et al., 3,548,062 to Smith and 3,571,850 to Pohto, for example. In U.S. Pat. No. 3,548,062 to Smith, a technique is disclosed in the specification for promoting gas circulation comprising a baffle between the workpiece and the heating elements positioned more or less uniformly along the inside wall such that gases are drawn up through the space between the baffle and the heating elements and are permitted to flow down over the workpiece being cooled by transferring heat to the workpiece. As the workpiece heats up, the hot gases passing the workpiece are not as rapidly cooled and therefore the circulation of the gases slows down. In U.S. Pat. Nos. 3,419,935 to Pfeiler et al. and in 3,571,850 to Pohto, gas circulation is promoted by a liner between the workpiece and a furnace wall and by heating gas just below the workpiece and allowing the gas to rise transferring heat to the workpiece as it flows past and then permitting the gas to flow back down between the liner and the furnace wall. These furnaces have been limited to the use of metal resistance elements due to the configuration of the hearth and furnace bottom. This is a substantial disadvantage as graphite and silicon carbide heating elements offer distinct advantages in certain environments.

There currently exist numerous uses for apparatus that treat a specimen or workpiece at high pressures and high temperatures including, for example, gas pressure bonding furnaces and hot isostatic pressing apparatus. In these apparatus, it is typical to treat a workpiece at 1000° C. and 15,000 psi although these are not the maximum temperature and pressure conditions encountered. Suitable apparatus for these applications generally comprises a furnace within a pressure vessel or autoclave. The furnace provides the heat to the workpiece and protects the vessel from excessive temperature. The vessel maintains the furnace and the workpiece at the desired pressures.

For a given pressure, the diameter of the pressure vessel determines the minimum safe thickness of the vessel wall. To avoid extremely heavy vessels, it is desirable to reduce the vessel diameter as much as possible. Stated another way, the space between the interior of the vessel lining and the workpiece should be very small even though this is the space occupied by the furnace.

In most processes, it is essential that the temperature of the workpiece be extremely uniform. Otherwise, problems may result from differential thermal expansion of the workpiece. Thus, the furnace portion of the high pressure-high temperature apparatus must distribute the heat evenly to the workpiece.

It is an advantage of this invention to provide an autoclave or pressure vessel-furnace structure that minimizes the diameter of the pressure vessel, while at the same time providing for even distribution of heat to the workpiece in a way to obtain uniform workpiece temperature.

SUMMARY OF THE INVENTION

Briefly, according to this invention there is provided an apparatus for gas pressure bonding, hot isostatic pressing or the like in which a workpiece may be treated at elevated temperatures and pressures. The apparatus comprises an elongate cylindrical pressure vessel. The pressure vessel further comprises an insulated hood for enclosing the workpiece and a hearth upon which the workpiece rests. The hearth is set upon an elongate refractory pedestal and a cylindrical heating element surrounds the pedestal completely below the hearth. Preferably the heating element is carbon or graphite. The heating element may be SiC for oxidizing atmospheres at lower power requirements. A cylindrical refractory reflecting shield is disposed about the pedestal and heating element in a way to permit convection to transfer heat from the heating element to the workpiece placed upon the hearth.

DESCRIPTION OF PREFERRED EMBODIMENTS

Figure 1:
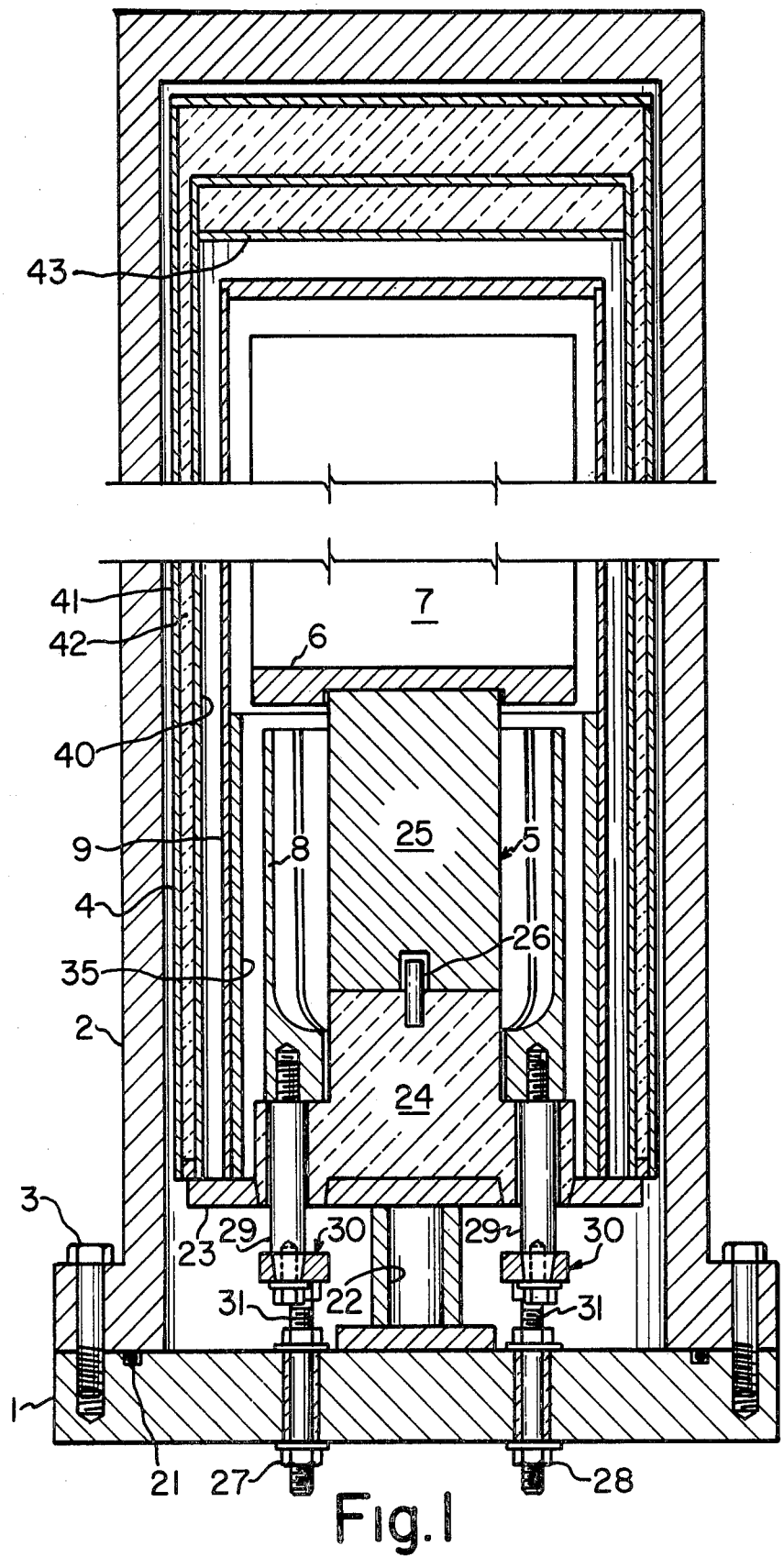
Figure 2:
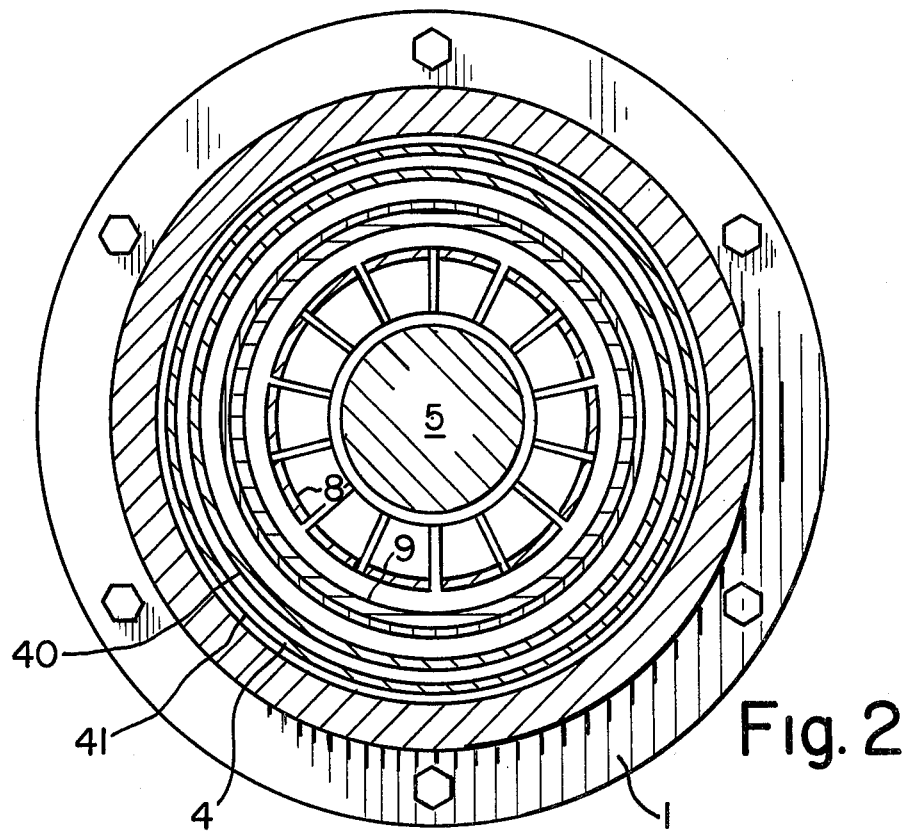
Figure 4:
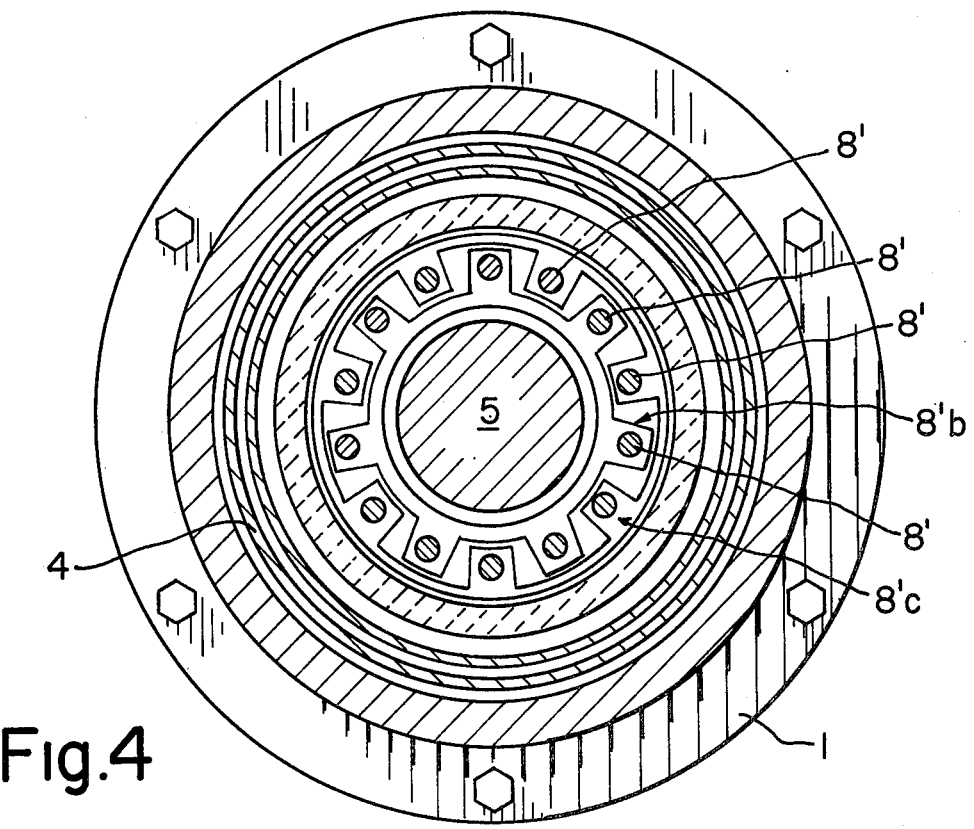
Figure 3:
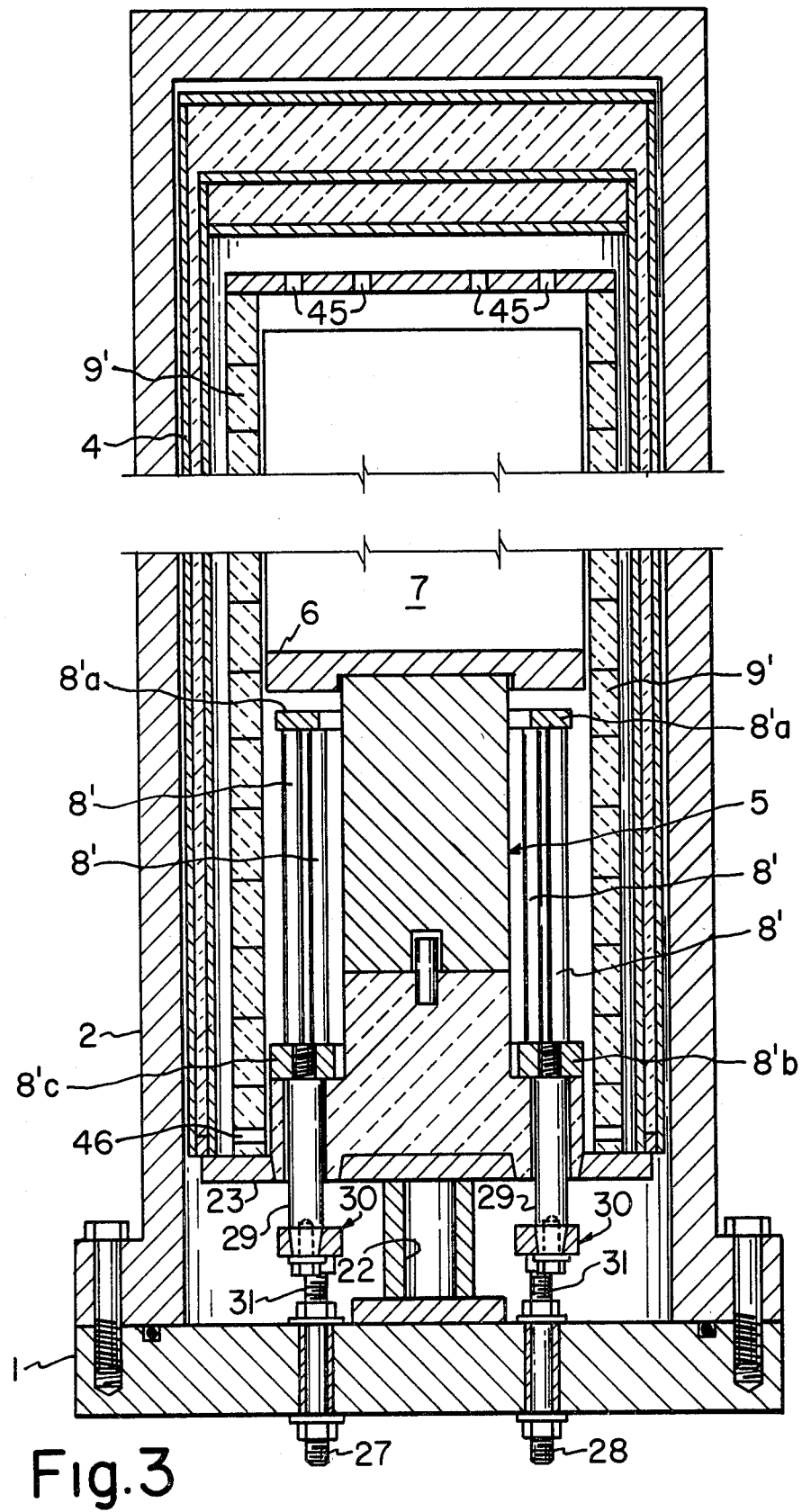
Figure 5:
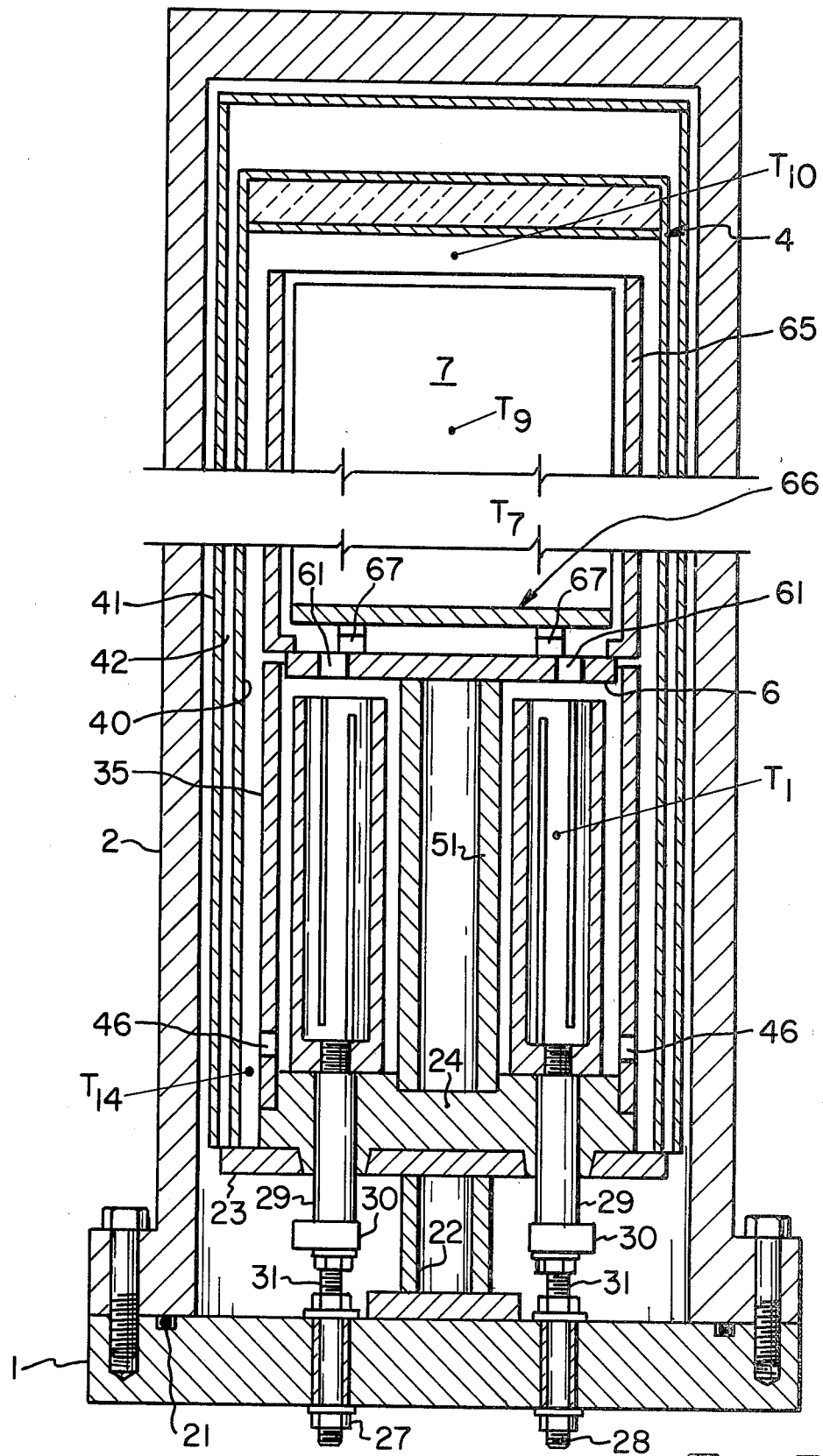
Figure 6:
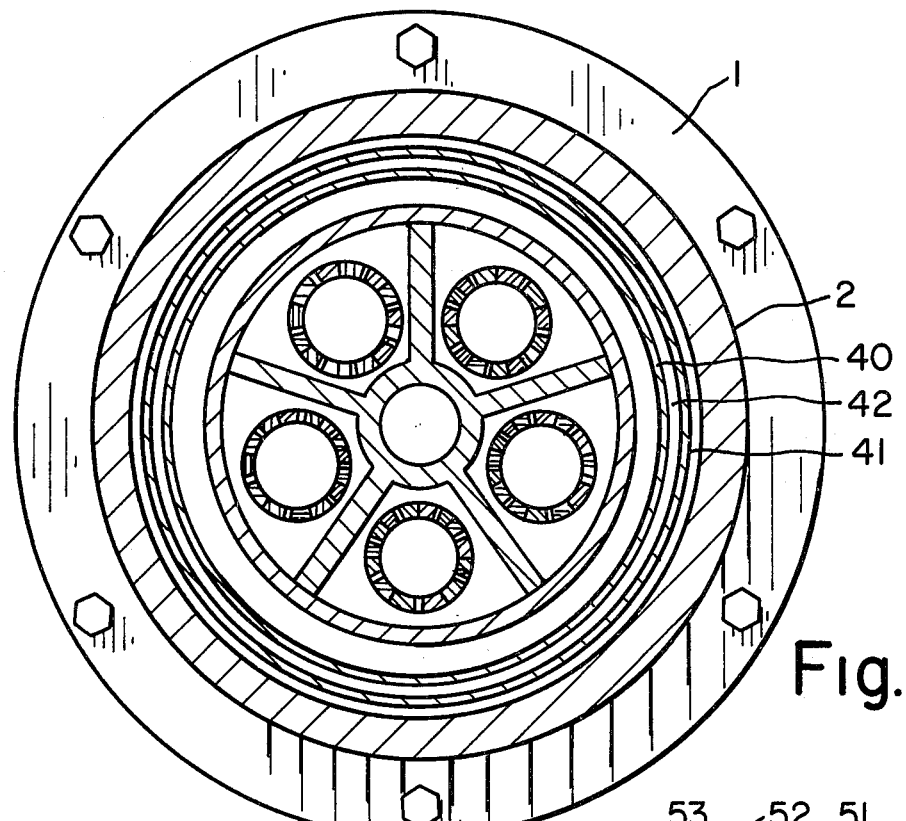
Figure 7:
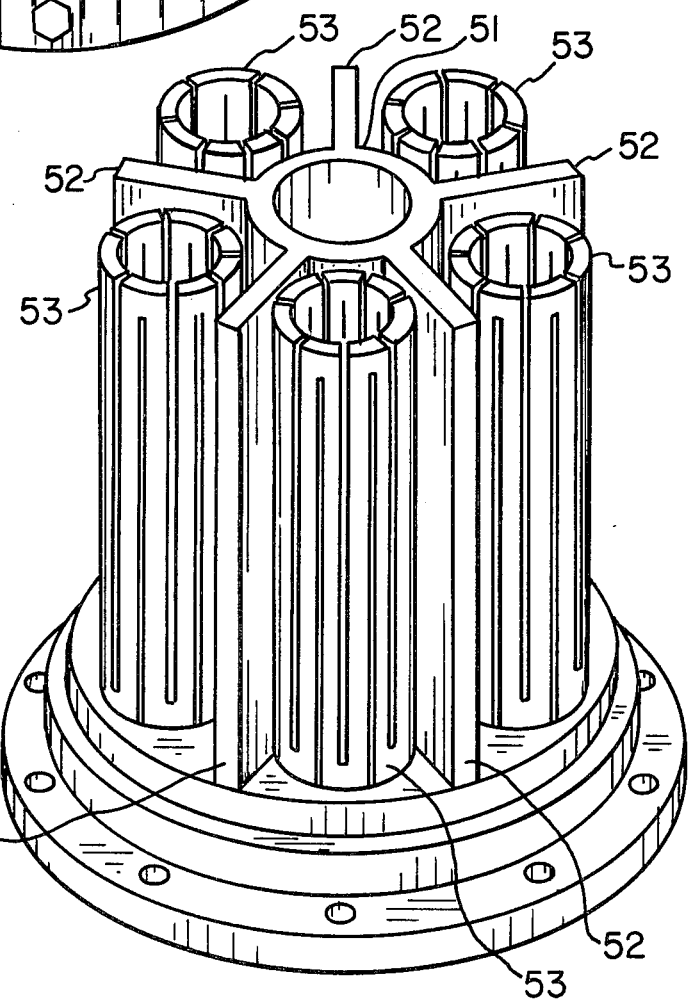

Further features and other objects and advantages of this invention will become clear from reading the following detailed description with reference to the drawings in which:

FIG. 1 is a section view through a furnace according to one embodiment of this invention, FIG. 2 is a plan view in section corresponding to FIG. 1, FIG. 3 is a section view of yet another embodiment of this invention, FIG. 4 is a plan view corresponding to FIG. 3, FIG. 5 is a section view through still another embodiment of this invention, FIG. 6 is a plan view in section corresponding to FIG. 5, and FIG. 7 is a perspective view of the pedestal and heating elements of the embodiment of FIG. 5.

Referring to FIG. 1, there is shown a pressure vessel 1,2 arranged outside of a furnace comprising a hood 4, a reflecting lining 9, and a heating element 8. A workpiece 7 is supported upon a hearth 6 and elongate pedestal 5.

More specifically, referring to FIG. 1 there is shown a pressure vessel or autoclave comprising a base 1 and an inverted hat-shaped shell 2. The flange at the base of the shell is provided with openings through which fastening means 3 enable the shell to be secured to the base. An O-ring or gasket 21 provides a pressure tight seal. The base or the hood is provided with openings (not shown) which are connected to means for pressurizing the interior of the vessel, for example, with an inert atmosphere. Pressures up to 15,000 psi are typical. The thickness of the shell depends upon the pressures to be contained and the diameter of the shell. Typically the shell is made from high strength steel.

According to this invention, a pedestal 5 set upon the base supports a hearth 6. The hearth should be strong enough to support the workpiece at working temperatures. The pedestal should have as low a heat capacity as possible. In this way, more of the energy introduced into the furnace is available to heat the workpiece and less is required to heat the pedestal. Placed on top of the pedestal is a hearth 6 having a diameter greater than the diameter of the pedestal. This enables the base of the workpiece 7 to be greater than the top of the pedestal 5.

Preferably the pedestal 5 comprises a foot 22 supporting a furnace bottom 23 somewhat above the base 1. The foot 22 and the furnace bottom 23 may be constructed of carbon steel. Setting upon the furnace bottom is a heat and electrical insulating support 24 which may be made from refractory insulating or high aluminum castable. The support has a raised inner portion of small diameter upon which sets a graphite pedestal extension 25. A graphite hearth 6 tops the pedestal extension. An anchor 26 fixed in the insulating support slidably engages the graphite pedestal extension to ensure alignment.

Surrounding the pedestal but not in contact therewith is a cylindrical carbon or graphite, or SiC electrical resistance heating element 8. The heating element 8 may be made from a hollow right cylinder with cuts from alternate axial directions to provide a sinuous electric path through the heating element (See FIGS. 1 and 2). On the other hand, the heating element may comprise a cylindrical cage of rods 8' by caps 8'a spanning the pair, with adjacent rods forming pairs joined at the top (See FIGS. 3 and 4). Two conducting rings, one 8'b with external teeth and another 8'c with internal teeth are arranged around the pedestal to form bases to support the cylindrical rods 8' and to provide the pairs of rods with electrical current. This arrangement is particularly good when the heating element is comprised of SiC.

Electrical connecting means 27 and 28 are provided through the base of the vessel to supply an electrical current at an appropriate voltage level to the heating element.

In a preferred embodiment, the furnace bottom 23 and the insulating support 24 have openings therein to permit graphite or carbon rods 29 threaded to the heating element 8 to pass into the space below the furnace bottom. Here means 30 couple the rods to a terminal 31 which is connected to an electrical conduit passing through the base 1.

A refractory reflecting shield 9 is provided about the periphery of the heating element. Its principal function in the embodiment shown in FIGS. 1 and 2 is to prevent radiation directly outward from the heating element toward the hood 4.

As shown in FIG. 1 the reflecting shield may comprise two elements, a shorter ceramic or graphite tube 35 radially outward of the heating element 8 and a refractory metal shield, for example, Iconel 601 enclosing the workpiece and the pedestal. The reflecting shield may comprise a load as shown and may be made of ceramic or graphite.

As shown in FIGS. 1 and 2, the reflecting shield comprises a sealed hood made of a refractory metal. Circulation takes place within the hood due to the heat losses through the side and top of the hood as follows: hot gas, due to the buoyancy effect is accelerated upward from the heating elements along the side of the hood. As the hot gas moves along the side of the hood (and upon reaching the top) it is cooled; it becomes heavier; and it flows back down toward the heating elements. This circulation enhances temperature uniformity in the workpiece. If the hood 9 was insulated, then the hot gas would slowly rise and stagnate at the top of the hood moving back downward only very slowly. This latter situation might result in a temperature gradient along the workpiece.

Referring now to FIGS. 3 and 4, there is shown an embodiment wherein the radiation shield 9' comprises an insulating refractory, say a light weight insulating brick or refractory castable. In this instance, no separate ceramic heat shield (such as shield 35 of FIG. 1) is necessary. The shield has the heat insulating characteristics of the insulating brick or castable. Thus, the top and bottom of the shield must be vented as shown in FIG. 3. Holes 45 in the top of the insulated shield are preferably centrally spaced and of such area as to permit sufficient flow to maintain temperature uniformity in the workpiece. Return holes 46 at the base of the hood enable the complete circulation around the hood. Comparison of the shield embodiments of FIGS. 1 and 3 may be summarized as follows: if not insulated, the shield is not vented—if insulated, then vented.

FIGS. 5, 6 and 7 relate to an embodiment of this invention which has proven to be particularly satisfactory. The autoclave or pressure vessel 1,2 and the hood 4 are substantially as shown in FIGS. 1 and 3. Also the foot 22, furnace bottom 23, insulating support, and the electrical connections 27, 28, 29, 30, and 31 through the base are substantially the same.

In this embodiment the pedestal comprises an elongate hollow carbon or graphite cylinder 51 with radially extending plates 52 (See FIG. 7). The heating element comprises five hollow cylindrical carbon or graphite heating elements 53 having their own leads and thus being separately controllable. Cuts from alternate axial directions provide a sinuous electrical path through the heating element. Each cylindrical heating element has a configuration similar to the sole element shown in FIGS. 1 and 2. It is contemplated that each element 53 will be powered up and down together. It is unlikely that they would be controlled to different power levels unless, of course, there was a failure in the leads to one element or the element itself. Such a failure would not require a shutdown under most conditions as it would only effect one-fifth of the power input capability.

In this embodiment, the hearth 6 is provided with a plurality of holes 61 therein to permit convection of the pressurized gases heated in the vicinity of the heating elements to flow upwardly to the workspace above the hearth. The holes are located and sized to minimize heat transfer to the workpiece by radiation.

The radially extending plates 52 help to transfer heat from the elements to the gases by absorbing heat transferred by radiation and releasing heat transferred by conduction. The carbon, graphite and SiC elements have the advantage of being able to handle more power through their unit surfaces than refractory metal heating elements. This results in faster heating rates for the vessel. This embodiment is particularly good for high power levels and rapid heating rates.

The embodiment of FIGS. 5, 6, and 7 does not have a reflecting shield such as in the embodiments of FIGS. 1 and 3 extending the entire length of the vessel along the pedestal and workspace. Rather, a graphite tube 35 radially outward of the heating elements serves to prevent direct radiation from the elements to the hood and to channel convection flow. Openings 46 in the base of the tube 35 permits incoming flow of convection currents. A cylindrical basket 65 rests upon the hearth 6.

The basket is made of refractory metal wire mesh or the like and while relatively impermeable to gas is not a good heat insulator. The basket is arranged to be raised and lowered into the workspace with the workpiece resting upon the basket bottom 66 which acts as a second hearth separated from the hearth 6 by blocks 67. When the bottom 66 rests on the blocks 67, an annular space exists between the hearth 6 and basket bottom 66 enabling the convection flow upward along the side of the workpiece. The basket 65 and tube 35 together perform the shielding and channeling functions of shield 9 in FIGS. 1 and 3.

An autoclave furnace, similar to that shown in FIGS. 5 to 7 in all respects essential to this invention, has a workspace of about 44 inches in height and 18½ inches in diameter. This particular furnace was wired with thermocouples in the workspace positioned one inch above the bottom, at the top and substantially equally spaced therebetween designated $T_7$, $T_8$, $T_9$, and $T_{10}$ respectively. Thermocouples (five) were placed adjacent the heating elements. Since they always registered the same temperature, they are collectively designated $T_1$. A thermocouple was positioned just outside the openings 46 and was designated $T_{14}$. Other thermocouples were placed around the furnace, but are not pertinent to this discussion.

The thermocouples enabled the determination of workspace temperature uniformity on heating and at the hold temperature under various load conditions. The steady state hold conditions for a no-load test, a half load (250 lbs.) test and a full load (500 lbs.) test are set forth in the following table.

| Load Condition | Thermocouples (degrees Centrigrade) | | | | | | Power Consumption |
|---|---|---|---|---|---|---|---|
| | $T_1$ | $T_7$ | $T_8$ | $T_9$ | $T_{10}$ | $T_{14}$ | |
| Empty | 1278 | 1227* | 1200 | 1209 | 1210 | 1102 | 50–55 Kw |
| Half full | 1270 | 1215 | 1205 | 1205 | 1200 | 1080 | 50–55 Kw |
| Full | 1270 | 1210 | 1205 | 1202 | 1200 | 1130 | 50–55 Kw |

*(Thermocouple placed along edge of bottom rather than one inch above bottom.)

The table establishes that for autoclave furnaces according to this invention, the workspace will have a uniform temperature (within 10° to 20° C.) at the steady state or hold conditions. The furnace was in each case pressurized to 15,000 psi.

The temperature uniformity on heat-up depends upon the load. For the most difficult case, full load, the temperature spread within the workspace varied up to 100° C. for heating rates of about 300 Centigrade degrees per hour. The temperature spread diminished as the hold temperature was approached. During heat up, the power input varied from 100 to 120 Kw's.

Cooling a loaded furnace is a substantially different problem. Even for slow cooling rates of say, 150° Centigrade per hour temperature differences develop (up to 300 degrees Centigrade). By this time, however, most processes and workpieces can sustain the temperature gradients in the workspace. Also, the peak gradient does not develop until the top most portion of the workspace has cooled considerably, to say, 700° C.

The temperature between the thermocouples $T_{14}$ and $T_1$, set forth in the table, represents the driving force for assuring a circulation of convection currents. The gases passing the heating elements increase in temperatures between 100 and 150 degrees. In the embodiment described, during steady state conditions, a substantial portion of the temperature drop occurs between the top of the tube 35 and the openings 46. In this embodiment, heat transfer across the tube 35 is sufficiently restricted to permit the temperature gradient and associated convection currents to develop. The small annular space between the top of the tube 35 and the space between the hood 4, on one side, and the tube 35 and basket 65 on the other actually results in a slight temperature increase in the gas as it moves between the top of the basket and the bottom of the basket in the space between the basket and the hood. This may, in part, account for the excellent hold temperature uniformity in the workspace. While this embodiment is most similar to that disclosed in FIG. 3, in which gas flow is promoted in the space adjacent the hood, it is not essential that that space be insulated from the workspace.

The insulating hood 4 is the principal heat insulation separating the workpiece and the heating element from the pressure vessel shell. The hood is designed to minimize heat transfer to the shell and to have a low heat capacity. A number of hood designs are possible. One shown in FIG. 1 comprises a stainless steel inner lining 40 and a carbon steel outer lining 41 with ceramic fiber heat insulation 42 therebetween. Other hood structures might comprise no inner sheet and refractory insulating brick in place of the fibers. An additional axial heat shield may be placed at the upper end of the hood 43 for best results. It should be a refractory metal such as Iconel. As with the pedestal, the less heat energy absorbed by the hood, the more available for raising the temperature of the workpiece. Hence, the heat capacity of the hood should be minimized.

The heating element according to this invention is located completely below the workpiece and thereby does not occupy space between the workpiece 7 and the hood 4. This enables the diameter of the hood and therefore the shell to be reduced with the advantages described above. Surprisingly, it has been found that even though the heating element is completely below the workpiece, the furnace with the workpiece therein has good temperature uniformity at elevated temperatures. This is achieved without the use of mechanical means to induce convection currents in the furnace interior. The simple structure described above, in a manner not completely understood, provides the uniform heating of the workpiece by convection and without direct radiation or conduction.

Having thus described the invention in the detail and with the particularity required by the Patent Laws, what is desired protected by Letters Patent is set forth in the following claims.

We claim:

1. An apparatus for gas pressure bonding, hot isostatic pressing or the like in which a workpiece may be treated at elevated temperatures and pressures, said apparatus comprising an elongate cylindrical pressure vessel, an insulating hood for enclosing the workpiece and a hearth upon which the workpiece rests, the improvement comprising said hearth set upon and substantially entirely supported by an elongate refractory pedestal, a cylindrical heating element selected from the group carbon, graphite and a silicon carbide defining an electrical resistance path, said heating element being disposed about and spaced from said pedestal below the hearth extending substantially entirely along the length of the pedestal, a cylindrical insulating heat reflecting shield disposed about the pedestal and heating element vented near the base thereof, said hearth being a disc-like structure having a diameter greater than the diameter of the top of the pedestal and shielding any workpiece upon the hearth from direct radiation from the heating element, said pedestal, hearth, heating element and shield arranged to permit convection to transfer heat from the heating element to a workpiece placed upon the hearth and to minimize transfer of heat to the workpiece by radiation.

2. The improvement according to claim 1 wherein the pedestal is supported above the base of the pressure vessel on a footing providing a space between the pedestal and the base for electrical terminals and electrical connecting means.

3. The improvement according to claim 2 in which carbon, graphite or silicon carbide rods extend through openings in the pedestal and foot, said rods engaging the cylindrical heating elements at one end and being connected by said electrical conducting means to said electrical terminals at the other end.

4. The improvement in claim 1 wherein the reflecting shield is comprised of a cylindrical ceramic refractory radially outward of the heating element and a refactory metal hood enclosing the workpiece pedestal and heating element.

5. The improvement according to claim 1 wherein the heating element is a carbon or graphite cylinder having axial cuts therein to define a sinuous electrical path.

6. The improvement according to claim 1 wherein the reflecting shield extends to near the top of the workpiece and only having vents near the top thereof and near the base thereof.

7. The improvement according to claim 1 wherein the heating element is a cage of cylindrical rods in a circular arrangement around the pedestal, the rods being paired and having a bridge across adjacent pairs enabling a continuous electrical path.

8. The improvement according to claim 1 comprising a plurality of hollow cylindrical carbon or graphite heating elements each defining a sinuous electrical resistance path, said heating elements being circumferentially spaced from said pedestal below the hearth and extending substantially entirely along the length of the pedestal.

9. The improvement according to claim 8 wherein the pedestal is supported above the base of the pressure vessel on a footing providing a space between the pedestal and the base for electrical terminals and electrical connecting means.

10. The improvement according to claim 9 in which carbon or graphite rods extend through openings in the pedestal and foot, said rods engaging the cylindrical heating elements at one end and being connected by said electrical conducting means to said electrical terminals at the other end.

11. The improvement in claim 8 wherein the reflecting shield is comprised of a cylindrical ceramic refractory tube having heat insulating properties radially outward of the heating element and a refractory metal basket setting upon the hearth and enclosing the workpiece above the hearth.

12. The improvement in claim 8 wherein the pedestal comprises a cylindrical shape with plates extending radially outward thereof.

* * * * *